United States Patent Office 3,260,730
Patented July 12, 1966

3,260,730
REACTION OF METAL CARBONYLS WITH 5-MEMBERED CYCLIC DIENES AND COMPOUNDS PRODUCED THEREBY
Karl W. Hubel and Erwin Ludwig Weiss, Brussels, Belgium, assignors to Union Carbide Corporation, a corporation of New York
No Drawing. Filed Sept. 16, 1960, Ser. No. 56,366
Claims priority, application Great Britain, Jan. 9, 1958, 840/58; Belgium, Sept. 21, 1959, 582,877
15 Claims. (Cl. 260—332.1)

This invention is a continuation-in-part of the invention contained in application Serial No. 784,040, by Karl W. Hubel and Erwin Weiss entitled, "Process for the Preparation of Organo-Metallic Complexes and Products Resulting Therefrom," filed December 31, 1958, and now abandoned.

This invention relates to a process for the preparation of a broad class of organo-metallic complexes. More particularly, this invention relates to a process for making new and useful organo-metallic complexes by reacting an unsaturated five-membered cyclic compound with a metal carbonyl.

It is known from Rheilen and assoc. (Annalen, 482 (1930) 161) that butadiene-iron-tricarbonyl results from the reaction of butadiene and iron pentacarbonyl. The same reaction later formed the subject of the U.S. Patent 2,409,167 by P. Veltmann. However, all efforts of the former authors to extend the reaction to other diene systems have been unsuccessful and have only led to ill-defined products of unknown composition and structure.

More recently, Piper, Cotton and Wilkinson have described (J. Inorg. Nuclear Chemistry I, 165 (1955)) cyclopentadienyl-metal-carbonyl complexes resulting from the reaction of cyclopentadiene or dicyclopentadiene with some metal carbonyls. The reaction for making those complexes proceeds through the loss of one hydrogen atom from the cyclopentadiene reactant leading to complexes having a cyclopentadienyl ring in their structure. Comparable cyclopentadienyl-type complexes are also the subject of U.S. Patent 2,818,416 by J. E. Brown and H. Shapiro. Attempts by Pauson and Hallam (C. R. XVIe Congress of Pure and Applied Chemistry, Paris, 1957, p. 131) to avoid this cyclopentadienyl radical formation have been unsuccessful and have led to molecular rearrangement.

It is an object of the present invention to provide a process for making organo-metallic complexes which overcomes the foregoing difficulties in that the unsaturated five-membered cyclic reactant subsists as a preformed ring in the complex structure without loss of hydrogen or molecular rearrangement.

It is a further object of the present invention to provide a process for the production of new and useful organo-metallic complexes by reacting an unsaturated five-membered cyclic compound with the carbonyl of a transition metal.

It is another object of the invention to produce novel and useful organo-metallic complexes characterized by a preformed unsaturated five-membered ring in their structure.

Other objects of this invention will appear from the following description and appended claims.

According to this invention, a process for making novel organo-metallic complexes comprises reacting a carbonyl of a transition metal of the 6th, 7th or 8th subgroup of the Periodic Table with an unsaturated five-membered cyclic compound, the position 1 of which is occupied by a member selected from the group consisting of gold, boron, aluminum, gallium, indium, thallium, zinc, cadmium, mercury, the lanthanides, titanium, zirconium, hafnium, silicon, germanium, tin, lead, phosphorus, nitrogen, arsenic, antimony, bismuth, vanadium, niobium tantalum, iron, cobalt, nickel, platinum, palladium, oxygen, sulfur, selenium, tellurium, polonium, a

group, a

group and a

group, wherein R' is a member selected from the group consisting of hydrogen and an alkyl group, and R" is a member selected from the group consisting of an alkyl and an aryl group.

As stated above, suitable metal carbonyls found useful for the process of this invention are those of the transition metals of the 6th, 7th or the 8th subgroups of the Periodic Table, i.e., the term includes the carbonyls of iron, cobalt, nickel, ruthenium, rhodium, palladium, osmium, iridium, platinum, manganese, rhenium, chromium, molybdenum and tungsten. As defined in Sidgwick, "Chemical Elements and Their Compounds," volume I, 1950, p. 548, the term "carbonyl" includes (1) binary carbonyls having the formula: $M_x(CO)_y$; (2) carbonyl halides such as $Fe(CO)_4Hal_2$; (3) amines of the carbonyls and carbonyl halides; (4) carbonyl hydrides such as $Fe(CO)_2(CO.H)_2$ and their metallic derivatives, i.e., the salts thereof; (5) those derivatives where one or more carbonyl groups are substituted by other complex electron donor ligands such as nitrosyl groups; and (6) compounds with only one CO group on the metal. Also included for the purposes of this invention as within the scope of the term "carbonyl" are the products obtained from the reaction of metal carbonyls with oxygen and nitrogen bases.

The unsaturated five-membered cyclic compound employed in the process of this invention may be conveniently represented as a five-member cyclic diene having the following general formula:

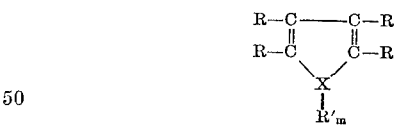

wherein R represents a monovalent substituent such as hydrogen, or a hydroxyl, halogeno, carboalkoxy group, or a substituted or unsubstituted alkyl, cycloaliphatic, alkoxy, phenoxy, or silyl group; X has the meaning defined above; R' is hydrogen, or a hydroxyl, halogeno, carboalkoxy group, or a substituted or unsubstituted alkyl, aryl, cycloaliphatic, alkoxy, phenoxy, silyl, cyclopentadiene, or cyclopentadienyl group; and $m$ represents an integer having a value of from 0 to 2.

It is to be understood that the presence of an $R'_m$ group will be determined by the remaining unfilled valency, if any of X, i.e., the representation of $m$ may be expressed as $m=$ valency of $X-2$.

Among those substituents preferred in the practice of this invention are those in which R is a lower alkyl or phenyl group and R' is a halogen, a lower alkyl, a phenyl or a cyclopentadienyl group. However, it must be emphasized that the character of the substituents R, R' and R" are not critical to the process of this invention. Hence, within the limits of practicality these substituents may vary widely. The critical feature of the process of this invention is the unsaturated five-membered ring and the character or nature of the occupant of position 1 of the unsaturated ring, i.e., of X.

In this regard, it should be noted that some of the cyclic compounds of the general formula $R_4C_4X$ in which X is $>C=0$ exist under normal conditions as dimers. For the purposes of the present invention, it is necessary that they be present at least in part in monomeric form, i.e., that the monomeric form exists at least in equilibrium with the dimeric form at the temperature of the reaction. The existence of the monomeric form can be ensured by using compounds in which at least some of the positions 2, 3, 4 or 5 are occupied by organic radicals. The substitution requirements, especially in connection with the existence of the monomeric form of cyclopentadienones have been discussed by C. F. Allen and J. A. Van Allan in J. Am. Chem. Soc., 72, 5165 (1950).

The metal carbonyl which reacts with the cyclic diene compound to produce the organo-metallic complexes of this invention may be produced in situ from the reaction of the metal and carbon monoxide according to the well-known procedure for preparing carbonyl compounds. In these reactions, the metal is usually reacted in the form of a freshly-reduced material. An alternate conventional procedure is that in which the metal carbonyl is produced as the result of the in situ reduction of a metal salt by a reducing metal in the presence of carbon monoxide.

The heterocyclic five-membered reactants employed as starting materials in the process of this invention may be prepared by the process described in copending applications Serial No. 18,805 filed March 31, 1960; Serial No. 36,130 filed June 15, 1960, now U.S. 3,151,140; and Serial No. 36,131 filed June 15, 1960, now U.S. 3,149,101; the disclosures thereof being incorporated herein by reference. The reactions disclosed in these copending applications shall be hereinafter designated, for convenience only, as Process A, Process B and Process C.

Generally speaking, Process A comprises the reaction of an organo-metallic complex having the formula:

$$M_x(CO)_y(R'C_2R'')_z(B)_w$$

with an element belonging to Groups IIIA, IVA, VA or VIA of the Periodic Table, or a compound containing at least one of the elements of those groups. In the above referred to organo-metallic complexes, M represents a transition metal belonging to the VI, VII or VIII subgroups of the Periodic Table, CO represents a carbonyl group, R' and R'' may be the same or different and represent hydrogen, halogeno, carboalkoxy, alkyl, aryl, cycloaliphatic, alkoxy or silyl groups and the like, including the substituted derivatives thereof, $C_2$ represents a carbon to carbon bonding, B represents a member selected from the group consisting of hydrogen, mercury, halogen, alkyl, aryl, or acyl, x represents an integer of from 1 to 4, y represents an integer of from 1 to 10, z represents an integer of from 1 to 6, and w represents an integer of from 0 to 4. It is to be noted that Process A is useful for the preparation of the aforesaid elements of Groups IIIA, IVA, VA or VIA of the Periodic Table.

Generally speaking, Process B comprises the reaction of a butadiene derivative having the formula:

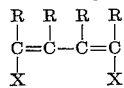

wherein X represents a halogen and wherein R represents a member selected from the class consisting of hydrogen, and alkyl and aryl groups; with a reactant represented by the formula:

$$(A)_xE(R')_y$$

wherein A represents a member selected from the group consisting of an alkali metal, and an alkaline earth metal; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R' represents a member selected from the class consisting of hydrogen and alkyl and aryl groups; x is an integer having a value of from 1 to 2; and y is an integer having a value of from 0 to 4.

Generally speaking, Process C comprises a reaction of a 1,4-dilithio butadiene with a reactant represented by the formula:

$$(B)_xE(R)_y(R')_w$$

wherein B represents a member selected from the class consisting of halogens, hydroxyl, alkoxy and phenoxy groups. E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R represents a member selected from the class consisting of substituted and unsubstituted alkyl, aryl, cyclopentadienyl, phosphino, cyclobutadienyl and cyclooctatetraenyl groups; R' represents a member selected from the class consisting of oxygen, sulfur, selenium, tellurium, and a carbonyl group; x is an integer having a value of from 1 to 4; y is an integer having a value of from 0 to 4; w is an integer having a value of from 0 to 2.

Representative five-membered cyclic reactants of the general formula $R_4C_4X$ which have been found useful for reacting with the metal carbonyls according to the present invention include:

Tetraphenyl cyclopentadienone (referred to as tetracyclone)
Tetra (p-chlorophenyl) cyclopentadienone 2.5-dimethyl-3.4-diphenyl cyclopentadienone
2.5-dimethyl-3.4-di(p-chlorophenyl) cyclopentadienone
1.3.5-triphenyl cyclopentadienone
2.4.5-triphenyl-3-(p-methoxyphenyl) cyclopentadienone
2-methyl-5-n-propyl-3.4-diphenyl cyclopentadienone
2.5-propyl-3.4-diphenyl cylopentadienone
2.5-diphenyl-3.4-di(p-phenoxyphenyl) cyclopentadienone
2.3.5-triphenyl-4-(p-dimethylaminophenyl) cyclopentadienone
3.4-diphenyl-2.5-di(trimethylsilyl) cyclopentadienone
3.5-diphenyl-2.4-di(trimethylsilyl) cyclopentadienone
2.5-diphenyl-3.4-(0.0' biphenylene) cyclopentadienone (referred to as phencyclone)
p-dimethylamino-anil of tetraphenyl cyclopentadienone
2.4-dinitrophenylhydrazone of tetraphenyl cyclopentadienone
Furan
2.3.4-trichlorofuran
2.5-dimethylfuran
2-benzoylfuran
2.5-dinitrofuran
2-chloromethylfuran
2-methyl-5-phenylfuran
Thiophene
2-bromothiophene
2-methylthiophene
2-phenylthiophene
2.4-diphenylthiophene
Tetraphenylthiophene
2-nitrothiophene
2.5-dinitrothiophene
Tetrachloro or tetrabromothiophene
Thiophene-1.1-dioxide
Tetraphenyl thiophene-1.1-dioxide
3.4-diphenyl thiophene-1.1-dioxide
3.4-dimethyl thiophene-1.1-dioxide
2.5-diphenyl-3.4-dibromo thiophene-1.1-dioxide
2.5-dimethyl-3.4-dibromo thiophene-1.1-dioxide 2.5-dibenzoyl-3.4-diphenyl thiophene-1.1-dioxide
selenophene
2.5-dimethyl selenophene
2.5-diphenyl selenophene
2.5-dichloro selenophene
Tetrachloro selenophene
Pyrrole
2.4-dimethyl pyrrole
2.5-dimethyl pyrrole
N-methylpyrrole
2-methyl-4-phenylpyrrole
2.3.5-trimethylpyrrole
Pentaphenylphosphole
P-phenyl-phosphole
P-phenyl-P-sulfide-tetraphenylphosphole
P-benzyl-tetraphenyl-phosphole and the oxide thereof
P-methyl-P-oxide-tetraphenylphosphole
Pentaphenylarsole
B-chloro-tetraphenylborole
Pentaphenylstibole and the oxide thereof
Pentaphenylbismuthole
Hexaphenyl-stannol
Al-methyl-aluminole
Hexaphenylsilole
In-methyl-tetraphenylindiole
Si-diphenyl-silole
Tetraphenyl-mercurole
Tetraethyl-mercurole
Zr-bis(cyclopentadienyl)-tetraphenyl-zirconole
Au-chloro-tetraphenyl-aurole
Au-chloro-tetramethyl-aurole
Pentaphenyl-borole
Pentaphenyl-thallole
Hexaphenyl-stannol
Hexaphenyl-zincole
Tetraphenyl-cadmiole
Ge-dimethyl-tetraphenyl-germanole
Hexaphenyl-plumbole
Ti-bis(cyclopentadienyl)-tetraphenyl-titanole
Hf-bis(cyclopentadienyl)-tetraphenyl-hafniole The inventive process is usually carried out at a temperature of from about 40° C. to about 300° C. However, in some instances, the reaction can also be successfully performed at room temperature, i.e., at 20° C. It is preferable to conduct the reaction in a closed system, particularly when one of the reactants is readily oxidizable and/or volatile at the reaction temperature. In that case, the reaction is conventionally carried out in a defined and limited volume, the air of which being preferably evacuated before initiating the reaction or replaced, at least in part, by an inert gas such as nitrogen, argon or carbon monoxide.

The reaction of the present invention is also preferably carried out in an inert solvent medium. In this regard, solvents useful in the inventive process include such aromatic and paraffinic hydrocarbons as benzene, toluene, xylene, petroleum ether, cyclohexane and isooctane. The choice of solvent depends upon the temperature range at which the reaction is conducted as well as on the respective solubilities of the reactants and their products in the solvent selected. However, the reaction can also be carried out without a solvent when at least one of the reactants is liquid at the reaction temperature.

The process of the invention is also preferably carried out using stoichiometric amounts of the five-membered cyclic diene and carbonyl reactants. However, it has been found that an excess of one of the reactants can also be used without detrimental effect. In particular, an excess of the metal carbonyl is sometimes desirable in order to compensate for the loss of carbonyl due to decomposition at the temperature of the reaction.

The novel complexes produced by the process of this invention may be represented by the general formula:

$$M_xA_yB_z$$

in which M is a transition metal selected from among the metals of the 6th, 7th and 8th group of the Periodic Table of Elements, B is a carbonyl group and A is an unsaturated cyclic compound having a pentatomic ring of the formula $R_4C_4X$ in which $C_4X$ and R correspond to the meanings previously defined and in which $x$, $y$ and $z$ are whole numbers which may assume respectively the following values:

for $x$, from 1 to 4 inclusive
for $y$, from 1 to 4 inclusive
for $z$, from 0 to 8 inclusive Although the mechanism of this reaction is not fully understood, it has been noted that the reaction takes place with a total or partial liberation of the carbon monoxide group contained in the metal carbonyl employed. The chemical bond which is produced between the cyclicpenadiene and the reacting metal carbonyl can lead to a pi complex in which the pi electrons of the pentadiene system complete the electronic layer of the central metallic or metalloid atom, i.e., the metal M.

However, it should be noted that the complexes of this invention actually belong to at least three slightly different types. Type I comprises complexes in which the carbonyl groups are bound to the metal. These compounds are represented by the formula $M_xA_yB_z$, in which M, A and B have the meaning defined above, and in which $x$ is equal to 1 or 2, $y$ to 1 or 2 and $z$ to 1 to 8 inclusive, depending on the central metal atom. These are generally pi complexes.

The second group of complexes, i.e., type II, also of the pi type, can be represented by $M_xA_y$ in which M and A have the meanings defined above and in which $x$ has a value of 1 to 4 and $y$ of 2 to 4 inclusive.

The third group of complexes, i.e., type III, are those in which the bond is produced between the heteroatom X and the transition metal atom. This bond results from the fact that the heteroatom has one or more free electron pairs. The complexes of this type are also represented by the general formula $M_xA_yB_z$ as defined above, but are not considered to be pi complexes. A representative of this type of complex is

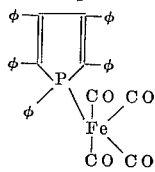

Finally, it can be seen that mixed complexes, i.e., complexes in connection with which the linkage takes place partially by pi linkage and partially by covalent linkage, may also result from the method described in the present invention.

The invention will be more readily understood by reference to the following purely illustrative examples which further indicate the inventive process as well as certain novel complexes falling within the scope of the invention.

*Example I*

4 g. of iron enneacarbonyl and 4 gr. tetraphenyl cyclopentadienone (referred to as tetracyclone) were reacted at room temperature (20° C.) in 100 ml. of benzene. The reaction mixture was maintained under a nitrogen atmosphere and slightly stirred for about 3 hours, until complete dissolution was obtained. During this period, 1 mole of $Fe(CO)_5$ and 1 mole of CO was evolved.

The solution was passed over a column of activated $Al_2O_3$ to separate $Fe(CO)_5$, the non-reacted tetracyclone and the product (tetracyclone)$Fe(CO)_3$, which was obtained in 80% yield. This reaction product appeared as a crystalline yellow compound which melted under decomposition at about 180° C.

For the formula $C_{32}H_{20}O_4Fe$, analysis showed.—Calculated (percent): C, 73.29; H, 3.84; Fe, 10.65. Found (percent): C, 73.19; H, 4.00; Fe, 10.63.

When the same operation was repeated at a slightly higher temperature, e.g., at 40–50° C., the reaction was completed in about 1 hour with a comparable yield.

A similar reaction occurred with iron enneacarbonyl and 2,5 diphenyl-3,4 (o,o′ biphenylene)-cyclopentadienone (referred as phencyclone) at 80° C. and a corresponding (phencyclone)Fe(CO)₃ was formed; yield: 85%.

The same reaction with tetra (p-chlorophenyl) cyclopentadienone led to the formation of [tetra-(p-chlorophenyl) cyclopentadienone] Fe(CO)₃ in about 50% yield. Analysis of the reaction produce $C_{32}H_{16}O_4FeCl_4$ indicated the following.—Calculated (percent): C, 58.04; H, 2.44; Fe, 8.43; Cl, 21.42. Found (percent): C, 58.04; H, 2.59; Fe, 8.68; Cl, 21.55.

*Example II*

4 ml. iron pentacarbonyl, 1 g. tetraphenyl cyclopentadienone and 10 ml. xylene were placed together in a sealed glass tube under nitrogen atmosphere and then heated to 150° C. for a period of 2 hours. The solvent and the excess of iron pentacarbonyl were distilled off in vacuum. The reaction product was

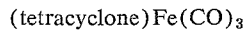

(tetracyclone)Fe(CO)₃ in substantially 100% yield.

*Example III*

The same operation as in Example 11 was repeated except that 3 gr. of 2,5-diphenyl-3,4 di(p-chlorophenyl)-cyclopentadienone was used as reactant and the reaction mixture, dissolved in 20 ml. of petroleum ether, was heated at 130–140° C. for about 15 hours. By means of a column of activated $Al_2O_3$, the yellow reaction product [2,5 diphenyl-3,4 di(p-chlorophenyl)-cyclopentadienone] Fe(CO)₃ was obtained in about 30–40% yield. Analysis of the final product, $C_{32}H_{18}O_4FeCl_2$, which melts with decomposition at 173–175° C., indicated the following.—Calculated (percent): C, 64.79; H, 3.06; Fe, 9.42; Cl, 11.95. Found (percent): C, 65.04; H, 3.12; Fe, 9.34; Cl, 12.5.

*Example IV*

The same operation as described in Example II was repeated except that 20 ml. of Fe(CO)₅ and 20.8 gr. of the dimer 2,5 dimethyl-3,4 diphenyl-cyclopentadienone, dissolved in 200 ml. of benzene, was heated at 185° C. for about 15 hours in an autoclave.

The reaction product $C_{22}H_{16}O_4$ Fe was obtained in about 80% yield; analysis indicated the following.—Calculated (percent): C, 66.03; H, 4.03; Fe, 13.95. Found (percent): C, 65.75; H, 4.07; Fe, 14.11.

*Example V*

1.7 gr. of tetracyclone and 1.5 gr. [Fe(CO)₄]₃ together with 150 ml. of toluene were placed in a glass vessel equipped with a refrigerant. The reaction mixture was then heated to 90–100° C. for about 1 hour. The mixture was then filtered. The filtrate was passed over a column filled with activated Al₂O₃ and yielded about 32% of (tetracyclone)Fe(CO)₃; the insoluble portion was identified as (tetracyclone)₂Fe₂, the yield in the latter compound being about 35%.

*Example VI*

4 gr. of tetraphenyl-thiophene-dioxide and 7 ml. of Fe(CO)₅ together with 10 ml. of benzene were placed in a sealed glass tube under nitrogen and then heated to 170° C. for about 15 h. The reaction product was isolated by passing the reaction mixture over a column filled up with activated Al₂O₃; the complex so obtained appeared as very stable yellow needles of melting point (with decomposition) at 232° C., and corresponded to (tetraphenyl - thiophene-dioxide)Fe(CO)₃. The yield was found to be 66%.

Analysis of the reaction product $C_{31}H_{20}O_5SFe$ indicated the following.—Calculated (percent): C, 66.44; H, 3.59; O, 14.27; S, 5.73; Fe, 9.97. Found (percent): C, 66.47; H, 3.46; O, 13.56; S, 5.86; Fe, 9.75.

*Example VII*

The same operation as described is Example VI was repeated except that 3 gr. of 3,4 dimethyl-thiophene-dioxide and 6 ml. of Fe(CO)₅ were used together with 20 ml. of petroleum ether (B.P. range 80–100° C.) and that the mixture was heated to 140° C. for about 17 hours.

The reaction product was a light yellow crystalline compound of melting point 149–150° C. i.e., (3,4 dimethyl-thiophene-dioxide)Fe(CO)₃ the composition of which was confirmed by analysis as follows.—Calculated (percent): C, 38.05; H, 2.83; O, 28.16. Found (percent): C, 38.31; H, 2.77; O, 27.87.

*Example VIII*

The same operation as described in Example VI was repeated except that 3 gr. of tetracyclone (p-dimethyl-amino-anil) and 5 ml. of Fe(CO)₅ together with 30 ml. of xylene were used as reactants. The system was heated at 170–180° C. for about 16 hours. After dissolution with benzene and after being passed over an activated Al₂O₃ column, a 66% yield of [tetracyclone-(p-dimethylamino-anil)]Fe(CO)₃ was obtained.

The yellow crystals of $C_{40}H_{30}O_3FeN_2$ showed a melting point (with decomposition) at 233–235° C. Analysis gave the following results.—Calculated (percent): C, 74.77; H, 4.70; O, 7.47; Fe, 8.70; N, 4.36. Found (percent): C, 74.8; H, 4.67; O, 7.62; Fe, 8.70; N, 4.42.

*Example IX*

2.30 gr. of tetracyclone and 1.63 gr. of

[Co(CO)₄]₂ Hg together with 20 ml. of petroleum ether (B.P. range 60–80° C.) were placed in a glass sealed tube under a nitrogen atmosphere. The system was then heated at 115° C. for about 10 hours. A crystalline product separated out which was filtrated and washed with petroleum ether.

The reaction product which appeared as dichroic dark red crystals corresponded to the formula $C_{62}H_{40}O_6HgCo_2$ and was produced in substantially 100% yield. Melting point (with decomposition) was about 195° C.

Analysis gave the following results.—Calculated (percent): C, 62.08; H, 3.36; O, 8.00; Hg, 16.73; Co, 9.83. Found (percent): C, 61.99; H, 3.34; O, 8.18; Hg, 16.34; Co, 9.77.

When the same operation was repeated but at a higher temperature, e.g., at 150–160° C. during about 17 hours, using benzene as solvent, the reaction product was a dark violet crystal of (tetracyclone)₄Co₃ which included some traces of mercury.

Analysis of the reaction product $C_{116}H_{80}O_4Co_3$ gave the following results.—Calculated (percent): C, 81.25; H, 4.70; O, 3.73; Co, 10.31. Found (percent): C, 81.20; H, 4.75; O, 3.94; Co, 10.24.

*Example X*

2.30 gr. of tetracyclone and 1.0 gr. of Co₂(CO)₈ together with 20 ml. of benzene were placed in a glass sealed tube under a nitrogen atmosphere. The system was then heated at 160° C. for about 17 hours. Dark violet crystals identical to those produced in the previous example were separated out. The yield was found to be about 72%.

*Example XI*

5.37 gr. of tetracyclone and 2.73 gr. of Mn₂(CO)₁₀ together with 20 ml. of petroleum ether (B.P. range 90–100° C.) were placed in a glass sealed tube under a nitrogen atmosphere. The system was heated at 150° C. for about 13 hours. The reaction mixture was then filtrated under nitrogen leading to a substance which appeared to be a readily oxidable one when in contact with air.

When the same operation was repeated using benzene or cyclohexane as solvent, the reaction product was soluble. Infra-red investigation of the drak brown solution so obtained showed a sharp adsorption band at 5.42 microns which revealed the occurrence of bridging carbonyls in the structure of the complex. The latter can be stabilized as an hydroxy-compound by a further treatment with either water or organic compounds having an active hydrogen, such as alcohols for instance. Using water a final product is obtained in about 50% yield which is assumed to be tetraphenyl-hydroxy-cyclopentadineyl-maganese-tricarbonyl in agreement with the general formula $C_{32}H_{21}O_4Mn$. The compound forms stable yellow needles which decompose at about 180° C.

Calculated (percent): C, 73.27; H, 4.04; Mn, 10.48. Found (percent): C, 73.01; H, 4.18; Mn, 10.54.

*Example XII*

2.88 gr. of tetracyclone and 2.2 gr. $Cr(CO)_6$ together with 25 ml. of benzene were placed in a glass sealed tube under a nitrogen atmosphere and then heated at 175° C. for about 60–70 hours. Almost dark crystals separated out. These were filtrated under nitrogen. The excess of $Cr(CO)_6$ was eliminated by sublimation at 40–50° C. under $10^{-2}$ mm. of Hg.

The black crystals were readily oxidable at air and showed a tendency for decomposition at about 130–140° C.

Analysis of the final product gave the following results.—Found (percent): C, 81.41; H, 4.74; Cr, 9.01; and appeared to be in good agreement with the valves which can be calculated assuming a formula $C_{116}H_{80}O_4Cr_3$ corresponding to the complex $(tetracyclone)_4Cr_3$.

*Example XIII*

1.92 gr. of tetracyclone and 1.32 gr. of $Mo(CO)_6$ together with 15 ml. of benzene were placed in a glass sealed tube under a nitrogen atmosphere. The system was then heated at 160–165° C. for 40 hours. After filtration, the solution is passed over a column filled up with activated $Al_2O_3$. First eluation gave only small quantities of non-reacted tetracyclone and molybdenum carbonyl. Using a mixture of ether and 10% of ethyl acetate as eluant, a yellow solution was obtained from which crystals of melting point (with decomposition) 205–210° C. were separated.

Infra-red investigation showed the stretching frequencies of terminal carbonyl groups bonded to the central metal atom at 4.95 microns and 5.09 microns and a sharp band at 6.06 microns characterized the >CO group of the tetracyclone. It is assumed that the compound was $(tetracyclone)_2 Mo(CO)_2$ of the general formula $$C_{60}H_{40}O_4Mo$$

as indicated by the results of the analysis.—Calculated (percent): C, 78.25; H, 4.38; O, 6.95. Found (percent: C, 78.48; H, 4.47; O, 6.91.

*Example XIV*

0.5 gr. of pentaphenylphosphole, 10 ml. of iron pentacarbonyl and 20 ml. of isooctane were placed together in a glass sealed tube and then heated at 150° C. for about 15 hours. After cooling at room temperature, the reaction mixture was diluted in benzene and filtered. The filtrate was concentrated by evaporation under reduced pressure, whereby the product was precipitated. Recrystallization in ethanol led to brown crystals having an M.P. of 186–188° C. The yield was almost quantitative. Analysis of the final product was in agreement with the values calculated assuming a formula $C_{38}H_{25}O_4FeP$ corresponding to pentaphenylphosphole-iron-tetracarbonyl.—Calculated (percent): C, 72.16; H, 3.99; P, 4.91; Fe, 8.83. Found (percent): C, 72.11; H, 3.83; P, 5.00; Fe, 8.67.

*Example XV*

2 gr. of pentaphenylphosphole, 6 grams of iron dodecacarbonyl and 200 ml. of isooctane were heated under reflux for about one hour. The reaction mixture was then filtrated to eliminate the insoluble matter. The filtrate was evaporated to dryness under reduced pressure. The residue was dissolved in hot ethanol. Upon cooling at room temperature, there was obtained a first fraction consisting of yellow crystals having an M.P. of 210–215° C. (with decomposition). The yield was about 10%. Analysis was in agreement with the values calculated assuming a formula $C_{37}H_{25}O_3FeP$ corresponding to pentaphenylphosphole-iron-tricarbonyl.—Calculated (percent): C, 73.52; H, 4.18; P, 5.14; Fe, 9.24. Found (percent): C, 73.33; H, 3.97; Fe, 9.65.

By concentration, the filtrate led to the separation of a second fraction (about 25%) which was identified as pentaphenylphosphole-iron-tetracarbonyl described in Example XIV. The separation of red crystals (M.P. 178–183° C. with decomposition) was also observed. These were assumed to be  $[(C_6H_5)_5C_4P]Fe_2(CO)_6$.

*Example XVI*

The operations described in Example XIV were repeated except that 1 gr. of pentaphenylphosphole oxide and 5 ml. of iron pentacarbonyl were employed. Yellow crystals having M.P. of 226–235° C. (with decomposition). The yield was almost quantitative. Analysis was in agreement with the values calculated assuming a formula $C_{37}H_{25}O_4P$ Fe corresponding to pentaphenylphosphole oxide-iron-tricarbonyl.—Calculated (percent): C, 71.62; H, 4.06; P, 5.01; Fe, 9.01. Found (percent): C, 71.76; H, 3.95; P, 5.05; Fe, 9.26.

*Example XVII*

The operations described in Example XIV were repeated except 0.5 gr. of pentaphenyl arsole and 3 ml. of iron pentacarbonyl were employed.

This reaction led to the formation of 0.44 gr. of yellow crystals (M.P. 155–170° C. with decomposition). Analysis was in agreement with the values calculated assuming a formula $C_{37}H_{25}O_3As$ Fe corresponding to pentaphenyl arsole-iron-tricarbonyl.—Calculated (percent): C, 68.54; H, 3.89; Fe, 8.61; O, 7.40. Found (percent): C, 68.68; H, 4.09; Fe, 8.20; O, 7.43.

*Example XVIII*

23.9 gr. of 6,6-dimethylfulvene and 82 gr. of $Fe_2(CO)_9$ were heated in 70 ml. of petroleum ether in a nitrogen atmosphere at about 55° C. for ½ hour. The filtrated solution was then concentrated under reduced pressure in order to eliminate the excess of fulvene and the $FeCO_5$ formed during the reaction. By cooling the remaining oil at about 0° C., 6.1 gr. of a yellow crystalline product (decomposition point: 92–95° C.) was obtained identified as being $(dimethylfulvene)_2Fe(CO)_2$. By chromatography, another crop of 3.1 gr. of the same product can be isolated. Total yield: 9.2 gr. (25%). The complex formed was soluble in benzene, petroleum ether and less soluble in methanol.

Analysis for $C_{18}H_{20}O_2Fe$ (mol. w. 324.21).—Calculated (percent): C, 66.68; H, 6.22; O, 9.88. Found (percent): C, 66.76; H, 5.96; O, 9.82.

*Example XIX*

66 gr. of $Fe_2(CO)_9$ were added in small fractions to a solution of 28 gr. of 6,6-diphenylfulvene in 150 ml. of petroleum ether and slowly heated up to 60° C. for 30 minutes. The reaction was conducted under nitrogen and with stirring. From the filtered red solution, a brownish product identified as $(diphenylfulvene)Fe(CO)_3$, Product I, crystallized out on cooling at 0° C. The yield of Product I was 9.5 gr. (21.5%); its melting point (with decomposition) was 95–97° C. By chromatography 5 gr. (7.5% yield) of (diphenylfulvene)Fe(CO)₃, Product II, and 0.6 gr. (1.1% yield) of (diphenylfulvene)Fe₂(CO)₅

Product III, were eluated.

Analysis for Product I (C₂₁H₁₄O₃Fe, mol. wt. 370.2) was as follows.—Calculated (percent): C, 68.12; H, 3.81; O, 12.97; Fe, 15.08. Found (percent): C, 68.11; H, 3.92; O, 12.87; Fe, 15.21.

Analysis for Product III (C₂₃H₁₄O₅Fe₂, mol. wt. 482.1) was as follows.—Calculated (percent): C, 57.30; H, 2.93; O, 16.60; Fe, 23.17. Found (percent): C, 57.66; H, 2.84; O, 16.44; Fe, 23.16.

The organo-metallic complexes of this invention are well defined, crystalline compounds, usually soluble in organic solvents such as benzene, toluene, xylene, acetone, ether, chloroform and partly soluble in petroleum ether. The compounds resulting from the inventive process can be involved in many further reactions. For instance, one or several carbonyl groups bonded to the central metal atom can be substituted by means of donor ligands such as triphenylphosphine, triphenylphosphite, isonitrile, arsine, stibine and the like. A typical example of such a substitution is as follows: stoichiometric amounts of the complex (tetracyclone)Fe(CO)₃ and of triphenyl-phosphine, dissolved in benzene, are heated together at about 120–140° C. Elution of the reaction mixture over a chromatographic column yields yellow needles of (tetracyclone)Fe(CO)₂P(C₆H₅)₃ the composition and the structure of which are confirmed by both chemical analysis and infra-red spectroscopy. Similar substitution occurs with other complexes when they are reacted with the donor ligands referred above. The triphenylphosphino-, arsino-, stibino-derivatives of the inventive organo-metallic complexes are useful catalysts, for instance in the trimerisation reactions of substituted and unsubstituted acetylenic compounds leading to substituted or unsubstituted benzol derivatives.

The complexes hereinabove described as belonging to type II are rather unsoluble. Hence they can readily be transformed into stable, soluble derivatives which are very useful in further syntheses. Treatment of a benzenic suspension of a complex such as (tetracyclone)₄Co₃ with HCl-gas leads to a compound identified as (tetracyclone)₂CoH characterized in that it includes an "acid" hydrogen in its structure. This acidic hydrogen can, for instance, be replaced by an acetyl or a methyl radical when (tetracyclone)₂CoH is reacted respectively with acetic anhydride or diazomethane. Sodium or potassium salts of (tetracyclone)₂CoH are readily obtained in excellent yield by reaction with sodium or potassium alcoholates.

The initial organo-metallic complex, for instance (tetracyclone)₄Co₃, is reobtainable in high yield when its sodium or potassium salt is further reacted with cobalt dichloride. These salt-like compounds appear therefore as a very convenient way for providing either an organo-metallic compound or a metal in conditions, media or solutions wherein such an organo-metallic or such a metal are usually not available or are unsoluble. Further this organo-metallic complex can be removed from the said conditions, media or solutions by an appropriate treatment similar to those hereby described.

Another general use for the organo-metallic complexes of the invention is that they are a convenient means for providing a metal, in particular a metal in its lower valency state, which normally shows catalytic properties in organic synthesis.

Some of the organo-metallic complexes herein described, especially those of manganese, are useful for the preparation of valuable anti-knock agents. For instance, the manganese complex, resulting from the reaction of manganese carbonyl and tetracyclone, can be further stabilized by treatment with a compound having an active hydrogen. For example, a treatment with water leads to (tetraphenyl-hydroxy-cyclopentadienyl)Mn(CO)₃ in which the hydrogen of the hydroxy group can be further substituted by organic groups such as methyl or the like. It is known that organo-metallic compounds of this type are valuable anti-knock agents for gasoline and other high energy fuels.

Certain of the organo-metallic complexes of this invention are also useful in obtaining heterocyclic pentadienes in a pure state. In this regard, heterocyclic pentadienes can be easily produced in the pure state by decomposing the appropriate complex.

What is claimed is:

1. A process for making organometallic complexes which comprises reacting (1) a carbonyl compound of a transition metal of the 6th, 7th or 8th subgroup of the Periodic Table, said carbonyl compound containing only metal atoms and carbonyl groups, with (2) a five-membered cyclic diene (a) the 1-position of said cyclic diene comprising one of the groups >C=O, >C=NR′ or >C=CR₂″, wherein R′ is hydrogen or lower alkyl and R″ is lower alkyl or phenyl, and (b) the other ring members of said cyclic diene being carbon atoms substituted only with hydrogen, lower alkyl, phenyl or halophenyl.

2. A process for making organometallic complexes which comprises the step of reacting a carbonyl compound composed of carbonyl and a transition metal selected from the 6th, 7th, and 8th subgroups of the Periodic Table with a cyclopentadienone, said cyclopentadienone being at least in part in monomeric form at the temperature of reaction, said temperature being from about 40° C. to about 300° C., and said cyclopentadienone containing substituents on its carbon ring members selected from only the group consisting of hydrogen, lower alkyl, phenyl, and halophenyl.

3. A process as claimed in claim 2, in which the transition metal is iron.

4. A process as claimed in claim 2, in which the transition metal is cobalt.

5. A process as claimed in claim 2, in which the transition metal is molybdenum.

6. A process as claimed in claim 2, in which the transition metal is chromium.

7. A process as claimed in claim 2, in which the transition metal is manganese.

8. A process as claimed in claim 2, in which the transition metal is nickel.

9. A process as claimed in claim 2, in which the transition metal is rhenium.

10. A process as claimed in claim 2, in which the transition metal is tungsten.

11. A process for making organometallic complexes which comprises reacting (1) a carbonyl compound of a transition metal of the 6th, 7th or 8th subgroup of the Periodic Table, said carbonyl compound containing only metal atoms and carbonyl groups, with (2) a five-membered cyclic diene, (a) the 1-position of said cyclic diene comprising one of the groups

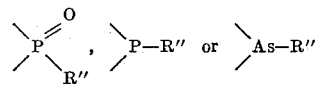

wherein R″ is lower alkyl or phenyl, and (b) the other ring members of said cyclic diene being carbon atoms substituted only with hydrogen, lower alkyl, phenyl or halophenyl.

12. A process for making organometallic complexes which comprises reacting (1) a carbonyl compound of a transition metal of the 6th, 7th or 8th subgroup of the Periodic Table, said carbonyl compound containing only metal atoms and carbonyl groups with (2) a five-membered cyclic diene, (a) the 1-position of said cyclic diene comprising the group >SO$_2$, and (b) the other ring members of said cyclic diene being carbon atoms substituted only with hydrogen, lower alkyl, phenyl or halophenyl.

13. The organometallic complexes produced by the process which comprises reacting (1) a carbonyl compound of a transition metal of the 6th, 7th or 8th subgroup of the Periodic Table, said carbonyl compound containing only metal atoms and carbonyl groups, with (2) a five-membered cyclic diene, (a) the 1-position of said cyclic diene comprising one of the groups >C=NR' or >C=CR$_2$″, wherein R' is hydrogen or lower alkyl and R″ is lower alkyl or phenyl, and (b) the other ring members of said cyclic diene being carbon atoms substituted only with hydrogen, lower alkyl, phenyl or halophenyl.

14. The organometallic complexes produced by the process of claim 11.

15. The organometallic complexes produced by the process of claim 12.

References Cited by the Examiner

UNITED STATES PATENTS 2,818,416  12/1957  Brown _____ 260—429

OTHER REFERENCES

Burton et al., Chem. and Ind., pages 1592–1593, November 29, 1958.

Fischer et al., Ber. Deut. Chem. No. 11, vol. 91, pages 2395–2398, Nov. 15, 1958.

Schrauzer, Chemistry and Industry, No. 43, pages 1403 and 1404, Oct. 28, 1958.

TOBIAS E. LEVOW, *Primary Examiner.*

ABRAHAM H. WINKELSTEIN, *Examiner.*

J. C. LANGSTON, W. J. VAN BALEN, T. L. IAPALUCCI, *Assistant Examiners.*